United States Patent [19]

Fujiwara et al.

[11] Patent Number: 5,107,472
[45] Date of Patent: Apr. 21, 1992

[54] TRACK ACCESS AND LASER BEAM ALIGNMENT SYSTEM FOR AN OPTICAL RECORDING AND REPRODUCTION APPARATUS

[75] Inventors: Tsuneo Fujiwara; Masaru Nomura, both of Tenri; Toshihisa Deguchi, Nara; Kunio Kojima, Nara; Takeshi Yamaguchi, Nara, all of Japan

[73] Assignee: Sharp Kabushiki Kaisha, Osaka, Japan

[21] Appl. No.: 376,412

[22] Filed: Jul. 5, 1989

[30] Foreign Application Priority Data

Jul. 8, 1988 [JP] Japan .................................. 63-171308

[51] Int. Cl.⁵ .......................... G11B 13/04; G11B 7/09; G11B 7/12
[52] U.S. Cl. ........................................ 369/13; 369/32; 369/54; 369/58; 369/59; 369/44.26; 369/44.28
[58] Field of Search .......................... 369/13, 32, 54, 58, 369/59, 44.26, 44.28, 121, 124; 360/59, 114; 365/122

[56] References Cited

U.S. PATENT DOCUMENTS

| | | | |
|---|---|---|---|
| 3,919,697 | 11/1975 | Walker | 369/43 |
| 4,547,872 | 10/1985 | Henmi et al. | 369/116 |
| 4,598,393 | 7/1986 | Pierce et al. | 369/116 |
| 4,720,825 | 1/1988 | Kokado | |
| 4,721,850 | 1/1988 | Sakai et al. | |
| 4,779,253 | 10/1988 | Getreuer et al. | 369/275.3 |
| 4,802,159 | 1/1989 | Nagai et al. | 369/275.3 |
| 4,835,752 | 5/1989 | Nakasu et al. | 369/32 |
| 4,888,753 | 12/1989 | Enari et al. | 369/32 |

FOREIGN PATENT DOCUMENTS 20177737 8/1985 European Pat. Off. .
61-190743 8/1986 Japan .................................. 369/13
2174531 11/1986 United Kingdom .

Primary Examiner—Stuart S. Levy
Assistant Examiner—Hoa Nguyen

[57] ABSTRACT

A track access operation system for an optical recording and reproducing apparatus using a medium having a plurality of guide grooves and ID sections utilized for identifying a particular guide groove. The intensity of reflected light and transmitted light from each of a plurality of light beams projected on the recording medium is monitored for determining the location of the beam on the disk. The system is designed such that at least either the plurality of light beams or the plurality of ID sections of the guide grooves are so arranged such that more than half of the light beams or more than half of the ID sections do not overlap in a parallel direction along the guide grooves whereby the number of light beams simultaneously projected on the ID sections is limited to less than half of the total number of light beams projected on the recording medium. Accordingly, even when the collection of light beams move in a perpendicular direction to the guide grooves, the number of pulses in the pulse signal is not influenced by the ID signals but coincident with the number of the guiding grooves through which the light beams have actually passed. With use of the optical memory system having such an arrangement, an accurate measurement of light beam movement is obtained resulting in high accuracy of access operations.

24 Claims, 10 Drawing Sheets

FIG. 2
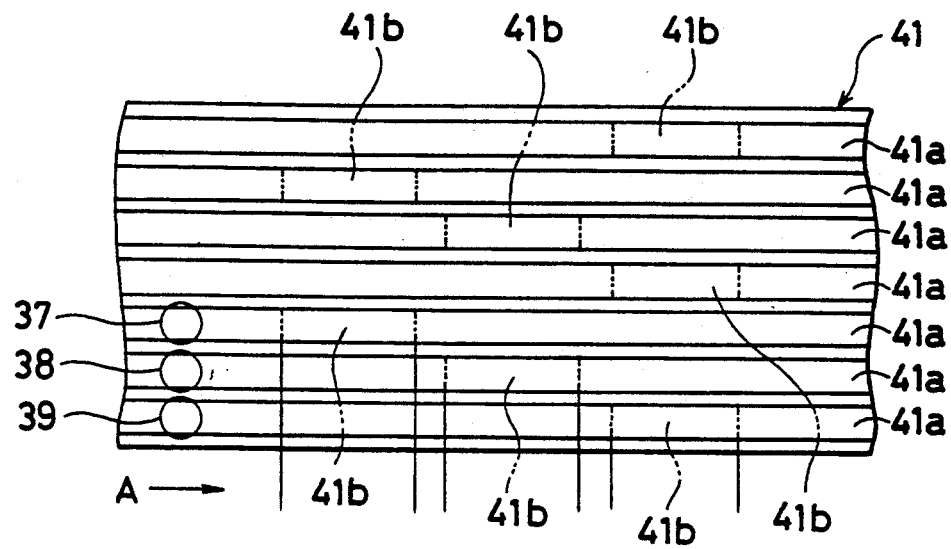
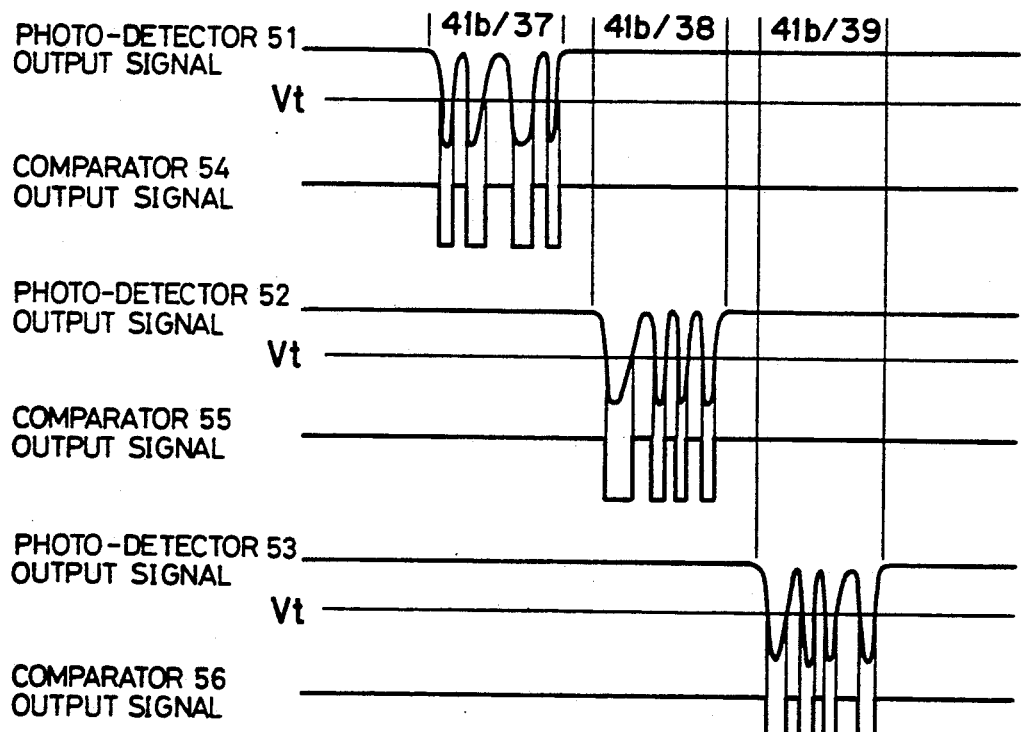
FIG. 14

FIG. 3
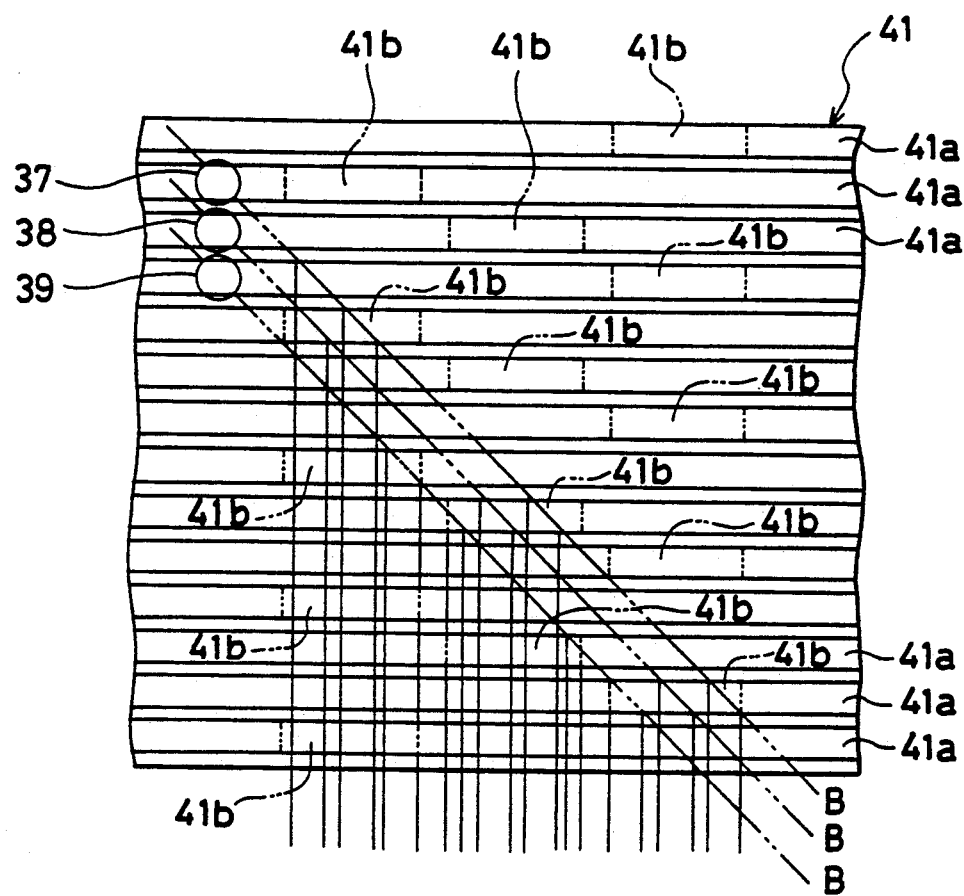
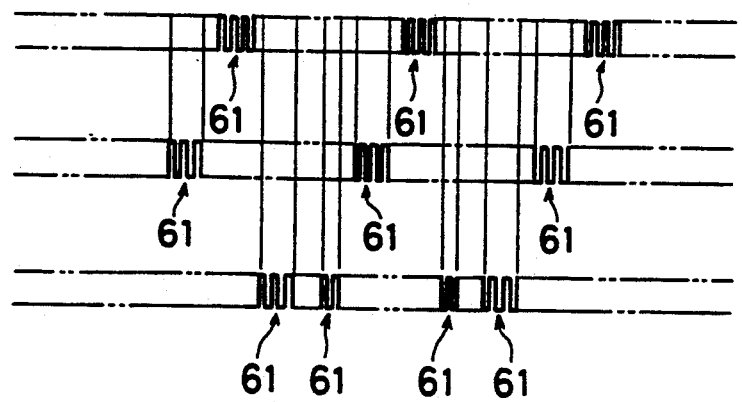
FIG. 15

FIG. 13
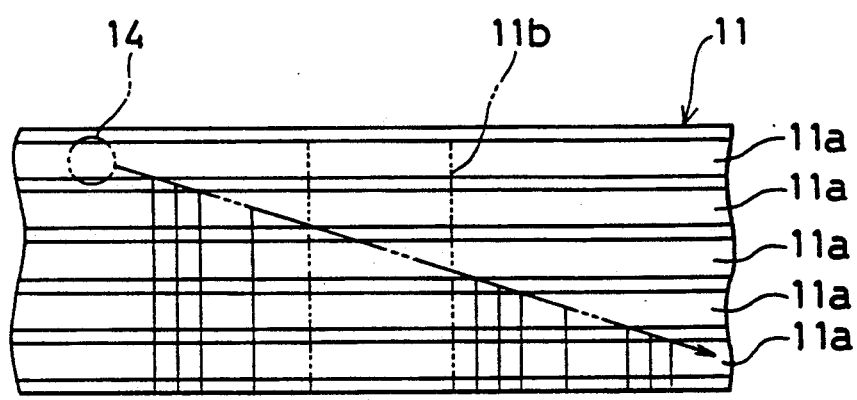
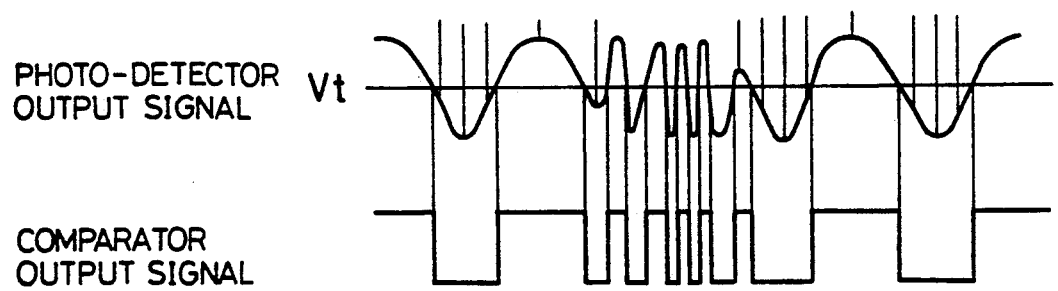
FIG. 17

TRACK ACCESS AND LASER BEAM ALIGNMENT SYSTEM FOR AN OPTICAL RECORDING AND REPRODUCTION APPARATUS

FIELD OF THE INVENTION

The present invention relates to an optical memory system capable of performing data recording and reproduction by projecting a light beam onto an optical recording medium in the form of a disk, a card or the like.

BACKGROUND OF THE INVENTION

Optical memory systems have been recently used for recording and reproducing large amounts of data. These systems include devices such as a magneto-optical memory system capable of recording and reproducing data in a magneto-optical recording medium such as a magneto-optical disk, magneto-optical card and others.

The magneto-optical recording medium comprises a disk-shaped or a card-shaped substrate made of a plastic or glass and a magnetic film made of Gd, Te, Fe, Co, or the like formed on the back face of the substrate. The direction of magnetization of the magnetic film changes according to an external magnetic field which exerts as influence upto the magnetic film, when the temperature rises to Curie point or higher.

With reference to FIGS. 6 and 7, there is shown a data recording operation using such a magneto-optical memory system. The magneto-optical disk 11 and the magneto-optical card 16 each have a magnetic film whose magnetizing direction is prefixed in a desired uniform direction as the device is rotated or slid. The effect of the external magnetic field generated by the magnet 12 or magnet 17 is applied to the device in the opposite direction to the magnetizing direction of the magnetic film.

At the same time, a light beam whose intensity varies in accordance with data to be recorded is converged by an objective lens 13 or objective lens 18 so as to have a diameter of approximately 1μm and is projected onto the magneto-optical disk 11 or the magneto-optical card 16.

In the case where the light beam has a high intensity, the temperature locally rises in the area irradiated by the light beam on the magnetic film of the magneto-optical disk 11 or the magneto-optical card 16. When this temperature increases higher than Curie point, the direction of magnetization of the magnetic film is inverted due to the effect of the external magnetic field generated by the magnet 12 or the magnet 17. Data recording can be performed by the above inversion of the magnetizing direction of the magnetic film of the magneto-optical disk 11.

On the other hand, when reproducing data from the magneto-optical disk 11, a light beam which is linearly polarized and has such intensity that the temperature at the magnetic film does not rise higher than Curie point is projected onto the magneto-optical disk 11, and specifically in the area where data has been recorded is traced. The polarization plane of reflected light from the magneto-optical disk 11 is inclined in compliance with the magentizing direction of the magnetic film at the area irradiated by the light beam due to magneto-optical effects such as Faraday effect and Kerr effect. The incline of the polarization plane of the reflected light is converted into an electric signal by a photo-detector by way of an analyzer, thereby reproducing recorded data.

When performing data recording or data reproduction as described above, it is required that the light beam be projected onto an appropriate position of the magneto-optical disk 11. Therefore, as shown in FIGS. 8 and 9, the magneto-optical disk 11 and the magneto-optical card 16 are respectively provided with guide grooves 11a and guide grooves 16a formed in a direction parallel to the relative moving direction of the light beam and the magneto-optical disk 11 or the magneto-optical card 16.

More specifically, when the light beam is projected in the vicinity of an edge protion of the guide grooves 11a, the intensity of the reflected light decreases owing to the effect of diffraction or the like. This decrease in the intensity of the reflected light is converted into an electric signal and detected separately from signals to be obtained by the aforementioned magneto-optical effects using the photo-detector, thereby judging whether the irradiating position of the light beam on the magneto-optical disk 11 is appropriate or not. Thereafter, on the basis of the signal thus detected, the irradiating position of the light beam is controlled whereby decentering and incline caused by installment of the magneto-optical disk 11 on a rotation axis or a slide stand can be cancelled.

As shown in FIGS. 10 and 11, an identification (ID) section 11b is disposed at a part of each guide groove 11a and an ID section 16b at a part of each guide groove 16a in order to identify on which groove the light beam is projected. Each ID section 11b has pits and when the light beam is projected on the ID sections 11b, the intensity of the reflected light changes due to diffraction or the like which occurs in accordance with the pit pattern. By detecting the change in the reflected light intensity and reproducing an ID signal, it can be identified on which guide groove 11a the light beam is projected. To project the light beam on a desired guide groove 11a, an access operation is performed by moving the light beam in a direction perpendicular to the direction that the guide grooves 11a extend. In this case, an ID signal cannot be reproduced during movement of the light beam, so that the travelling distance of the light beam to the desired guide groove 11a is estimated and a coarse access operation is carried out by moving the light beam the estimated distance.

Thereafter, the light beam is shifted in a nearest guide groove 11a where an ID signal is reproduced thereby judging whether the guide groove 11a on which the light beam is projected is the desired guide groove or not. Then, the light beam is gradually moved and the above discussed judging operation is repeated until the ID signal at the desired guide groove 11a is reproduced whereby the light beam can be projected on the desired guide groove 11a.

In the foregoing coarse access operation, the pitches of the guide grooves 11a and 16a are of the order of μm, whereas it is quite difficult to increase the mechanical accuracy of the system for moving the light beam to the same level as the above.

In order to overcome such a problem, the following arrangement has been conventionally proposed as shown in FIGS. 12 and 16. That is, reflected light from the magneto-optical disk 11 is guided into a photo-detector 22 via a half mirror 21 and converted into an electric signal. The electric signal thus obtained is converted into a binary signal with a threshold voltage Vt thereby obtaining a pulse signal. By using a so-called track count method in which the number of pulses in a pulse signal is counted by a digital counter (not shown), the number of guide grooves 11a through which the light beam has passed, i.e., the moving amount of the light beam can be obtained. Generally, the rotation or sliding of the magneto-optical disk 11 or the magneto-optical card 16 is continuously carried out during the access operation for projecting the light beam on a desired guide groove 11a, 16a. Therefore, the light beam sometimes obliquely crosses the guide grooves 11a, 16a passing through the ID sections 11b, 16b.

In this case, there exists in the output signal from the photo-detector 22, an ID signal or the like based on the pit pattern formed in the ID section 11b as shown in FIGS. 13 and 17, and therefore, the number of pulses in the pulse signal generated by a comparator 23 is not coincident with the number of guide grooves 11a through which a light beam 14 has actually passed.

In the conventional optical memory system as above described, the number of pulses in the pulse signal from the comparator 23 is included in the number of guide grooves 11a through which the light beam acutually has passed. Consequently, the moving amount of the light beam cannot be precisely obtained, and this results in low accuracy of the coarse access operation.

SUMMARY OF THE INVENTION

An object of the present invention is to provide an optical memory system wherein the number of guide grooves through which a light beam has actually passed can be counted even in the course of access operation for moving the light beam in a direction perpendicular to guide grooves 11a, by projecting a plurality of light beams on a recording medium and obtaining the reflected light or transmitted light of each light beam projected thereon.

Another object of the present invention is to provide an optical memory system wherein the number of light beams projected on ID sections at the same time is limited to less than half of the total number of light beams projected on the recording medium whereby the majority of the light beams projected on the recording medium are not projected on the ID sections even when the light beams are moved in a direction perpendicular to the guide grooves.

Still another object of the present invention is to provide an optical memory system wherein pulse signals generated by the effect of the ID sections are eliminated from the pulse signals generated according to the reflected lights or transmitted lights of a plurality of light beams projected on the recording medium so that a pulse signal corresponding to the guide grooves through which the respective light beams have actually passed is taken out thereby obtaining an accurate moving amount of the desired light beam and improving the accuracy of the access operation.

In order to achieve the foregoing objects, an optical memory system according to the present invention comprises:

light beam generating means for generating a plurality of light beams;

a recording medium comprising a plurality of guide grooves for guiding each of the light beams, and ID sections utilized for identifying a guide groove on which each of the light beams is projected;

a plurality of photo-detectors for detecting the intensity of the reflected light or tansmitted light of each of the light beams projected on the recording medium;

a plurality of comparators for converting a signal released from each of the photo-detectors into a binary signal.

a majority logic circuit for issuing a signal whose level is equivalent to the levels of the signals released from the majority of the comparators; and moving amount detecting means for detecting the moving amount of the light beams by counting the number of pulses in the pulse signal released from the majority logic circuit when the light beams move in a direction perpenducular to the guide grooves;

said optical memory system being designed such that at least either the plurality of light beams or the plurality of ID sections of the guide grooves are so arranged that at least more than half of the light beams or more than half of the ID sections are not perfectly overlapped in a parallel direction to the guide grooves whereby the number of light beams projected on the ID sections at the same time is limited to less than half of the total number of light beams projected on the recording medium.

The above recording medium may be made of a plastic, glass, or other material in the form of a disk or a card, and may include a magnetic film comprising Cd, Te, Fe, Co, or the like formed on the back face thereof, the magnetizing direction of the magnetic film changing in accordance with an external magnetic field which exerts an influence on the magnetic film.

The above majority logic circuit may comprise logical elements such as an AND gate and OR gate, and the above moving amount detecting means may comprise a digital counter.

The above recording medium may be arranged to have three adjacent ID sections placed so that at least two ID sections are not perfectly overlapped in a parallel direction to the guide grooves.

The above recording medium may be arranged such that while the ID sections are aligned in a direction perpendicular to the guide grooves, a plurality of light beams are projected at intervals longer than the length of the ID section.

The above light beam generating means may comprise a diffraction grating which diffracts a light beam from the light beam source into a zero-order light and two first-order lights.

The respective numbers of light beams, photo-detectors, comparators are not limited to three, but may correspond to the number of pulse signals with which a majority decision by the majority logic circuit can be performed.

BRIEF DESCRIPTION OF THE DRAWINGS

FIGS. 1 to 4 respectively show one embodiment of the present invention.

FIG. 1 is a diagram illustrating the construction of an optical memory system according to the present invention.

FIG. 2 is a diagram illustrating one example of light beams and an arrangement of ID sections of a magneto-optical disk, and one example of signals released from comparators and photo-detectors.

FIG. 3 is a diagram illustrating one example of signals released from the comparators when performing the access operation.

FIG. 4 is a diagram showing one example of the signals released from the comparators and a majority logic circuit.

FIGS. 6 through 13 respectively show an optical memory system according to the prior art.

FIG. 6 is a view showing the principle upon which data is recorded on a magneto-optical disk.

FIG. 7 is a view showing the principle upon which data is recorded on a magneto-optical card.

FIG. 8 is a perspective view showing the construction of the magneto-optical disk.

FIG. 9 is a perspective view showing the construction of the magneto-optical card.

FIG. 10 is an enlarged perspective view showing the construction of ID sections in the magneto-optical disk.

FIG. 11 is an enlarged perspective view showing the construction of ID sections in the magneto-optical card.

FIG. 12 is a diagram illustrating one example of signals released from a comparator and a photo-detector when access operation is performed.

FIG. 13 is a diagram illustrating one example of signals released from the photo-detector and comparator when a light beam crosses the ID sections.

FIG. 14 shows an example of output signals released from comparators and photo-detectors associated with FIG. 2.

FIG. 15 shows an example of output signals from comparators 54–56 associated with FIG. 3.

FIG. 16 shows an example of output signals from a photo-detector and comparator associated with FIG. 12.

FIG. 17 shows an example of output signals from comparators and photo-detectors associated with FIG. 13.

DETAILED DESCRIPTION OF PREFERRED EMBODIMENT

Referring now to FIGS. 1 to 4, one embodiment of an optical memory system for recording data in a magneto-optical disk and reproducing therefrom according to the present invention will be explained hereinbelow.

Figure 1:
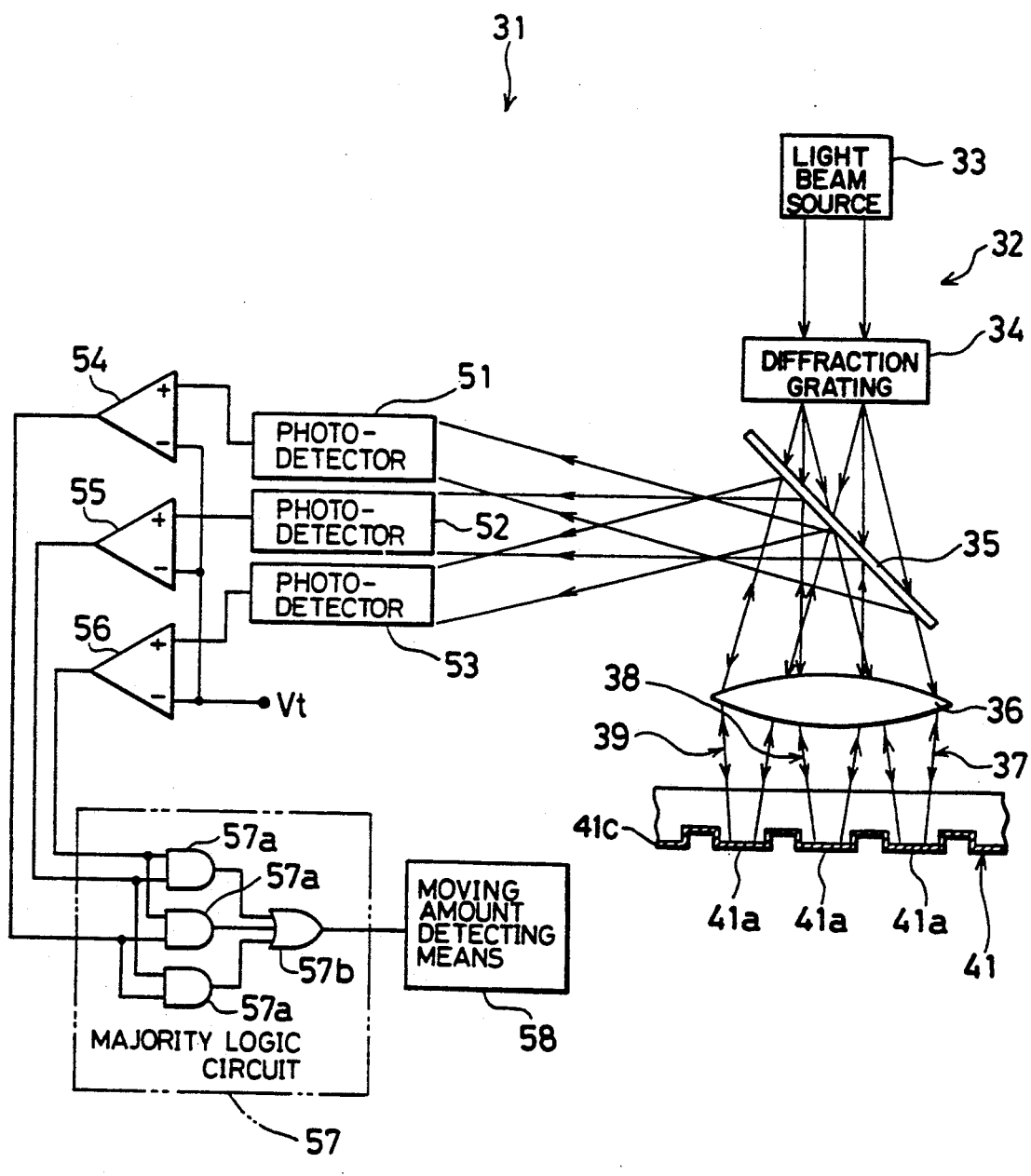

As shown in FIG. 1, an optical memory system 31 is provided with light beam generating means 32 comprising a light beam source 33 such as a laser light source and a diffraction grating 34. In the light beam generating means 32, a light emitted from the light beam source 33 is diffracted by the diffraction grating 34 into one zero-order light and two first-order lights, thereby generating three light beams 37 to 39. Provided under the light beam generating means 32 are a half mirror 35 and an objective lens 36. The objective lens 36 is designed to respectively converge the three light beams 37 to 39 generated by the light beam generating means 32 to project on a recording medium, i.e., a magneto-optical disk 41.

The magneto-optical disk 41 comprises a substrate made of, for example, plastic, glass, or other materials in the form of a disk, and the back face of the substrate is coated with a magnetic film 41c made of Gd, Te, Fe, Co or the like, of which magnetizing direction changes according to the effect of an external magnetic field which exerts an influence on the magnetic film 41c when the temperature rises to Curie point or higher. The magneto-optical disk 41 is rotated by an actuating means (not shown).

The magneto-optical disk 41 is also provided with guide grooves 41a for guiding the light beams 37 to 39, which form concentric circles. The light beams 37 to 39 generated by the light beam generating means 32 are projected on the adjacent guide grooves 41a.

The reflected lights of the three light beams 37 to 39 projected on the magneto-optical disk 41 are respectively diverted by the half mirror 35 and guided into photo-detectors 51 to 53 for detecting the intensity of each reflected light. These photo-detectors 51 to 53 are disposed to one side of the half mirror 35. The photo-detectors 51 to 53 are respectively connected to comparators 54 to 56 each of which compares the levels of a signal released from the respective photo-detectors 51 to 53 with a predetermined reference voltage Vt thereby generating a binary signal.

The comparators 54 to 56 are connected to a majority logic circuit 57 which has three AND circuits 57a and one OR circuit 57b. The majority logic circuit 57 generates a signal whose level is equivalent to the levels of signals released from two or more comparators out of the three comparators 54 to 56. In other words, if the majority, i.e., more than two, of the three binary signals simultaneously fed into the majority logic circuit 57 from the three comparators 54 to 56 are in the high level, the majority logic circuit 57 releases a high level signal. On the other hand, if the majority, i.e., more than two, of the above binary signals are in the low level, the majority logic circuit 57 releases a low level signal.

The majority logic circuit 57 is connected to moving amount detecting means 58 which counts the number of pulses in a pulse signal released from the majority logic circuit 57 when the light beams 37 to 39 move in a direction perpendicular to the guide grooves 41a in the magneto-optical disk 41, thereby detecting the moving amount of the light beams 37 to 39. This moving amount detecting means 58 comprises a digital counter or the like.

As shown in FIGS. 2 and 14, each of the guide grooves 41a in the magneto-optical disk 41 are provided with ID sections 41b. The ID sections 41b respectively have a pit pattern and are utilized for identifying guide grooves 41a on which the light beams 37 to 39 are projected. Hereinbelow, the pattern formed by the pits will be referred to as pattern of pits.

The following condition must be respected when designing the arrangement of the ID sections 41b provided on each of the grooves 41a and the arrangement of the light beams 37 to 39. Namely, among the plurality of light beams projected onto the magneto-optical disk 41, the number of light beams simultaneously projected on the ID sections 41b must be less than half the total number of light beams. FIG. 2 shows an example where the ID sections 41b and the light beams 37 to 39 are arranged so as to satisfy the above condition. In this example, suppose that, e.g., a first ID section 41b arbitrarily designated and provided on a first guide groove 41a is translated along the alignment direction of the guide grooves 41a (i.e., the direction perpendicular to the guide grooves 41a), to a second guide groove 41a adjacent to the first guide groove 41a. Here, it can be seen that the translated first ID section 41b does not overlap the second ID section 41b provided on the second guide groove 41a. Suppose now that the light beams 37 to 39 are respectively projected upon three adjacent guide grooves 41a, so as to be aligned in the alignment direction of the guide grooves 41a. The diameter of each of the light beams 37 to 39 is substantially equal to the width of each of the guide grooves 41a. With the above arrangement, more than half, i.e., more than two, of the light beams 37 to 39 do not happen to be projected on the ID sections 41b at the same time. Yet with the present invention, the fashion in which the ID sections 41b and the light beams 37 to 39 are arranged is not restricted to the configuration illustrated in FIG. 2.

In an optical memory system having the above construction, following the rotation of the magneto-optical disk 41, the projecting positions of the light beams 37 to 39 on the magneto-optical disk 41 move in the direction of the arrow A and the light beams 37, 38 and 39 initiate to enter the ID sections 41b respectively in this order. Subsequently, the photo-detectors 51 to 53 release signals according to the patterns of pits of the ID sections 41b, i.e. ID signals, and the comparators 54 to 56 release pulse signals according to the respective ID signals above mentioned. These pulse signals are deemed to be signals indicating guide grooves 41a on which the light beams 37 to 39 are respectively projected.

Figure 4:
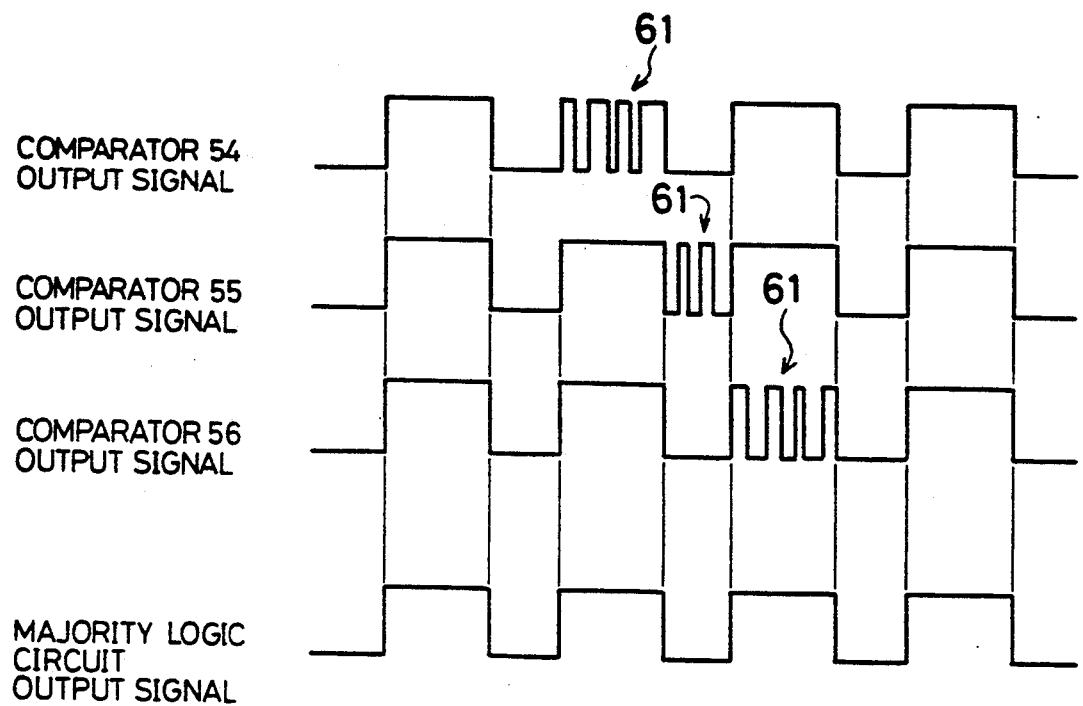

Concurrently, in order to permit the light beams 37 to 39 to be respectively projected on the desired guide grooves 41a, access operation is carried out so that the light beams 37 to 39 move in a direction perpendicular to the guide grooves 41a. In this case, since the magneto-optical disk 41 is continuously rotated even when the light beams 37 to 39 move in a direction perpendicular to the guide grooves 41a, the light beams 37 to 39 obliquely cross the guide grooves 41a as shown by the direction of the arrow B in FIGS. 3 and 15.

Where the light beams 37 to 39 obliquely cross the guide grooves 41a, the intensity of the corresponding reflected lights is decreased due to the effect of diffraction or the like each time one of the light beams 37 to 39 is projected on the vicinity of an edge portion of the guide groove 41a. Therefore, one of the comparators 54 to 56 issues a low level signal whenever one of the light beams 37 to 39 passes through the vicinity of an edge portion of the guide groove 41a.

Where one of the light beams 37 to 39 is projected on the ID section 41b in the magneto-optical disk 41, similar to when the light beams 37 to 39 respectively pass through the vicinity of an edge portion of the ID section 41b of the guide groove 41a, the intensity of the respective reflected lights is decreased due to the effect of diffraction or the like generated in accordance with the patterns of pits in the ID sections 41b. Accordingly, the comparators 54 to 56 issue pulse signal sequences 61 according to the ID signals, as shown in FIGS. 3 and 4.

In this invention, as the ID sections 41b and the light beams 37 and 39 are arranged as was described with reference to FIG. 2 so that when one of the light beams 37 to 39 is projected on the ID section 41b, the other two light beams are not projected on the ID sections 41b. As a result, two or more comparators do not issue pulse signal sequences 61 corresponding to the ID signals at the same time.

The majority logic circuit 57 releases a signal whose level coincides with the level (i.e., high level or low level) of the binary signals released from two or more of the comparators 54 and 56. Accordingly, as illustrated in FIG. 4, the signal released from the majority logic circuit 57 upon reception of the signals released from the comparators 54 to 56, is not influenced by the pulse signal corresponding to the ID signals 61 nor other signals. More specifically, the number of pulses in the pulse signal released by the majority logic circuit 57, is coincident with the number of guide grooves 41a through which the respective light beams 37 to 39 have actually passed.

Figure 5:
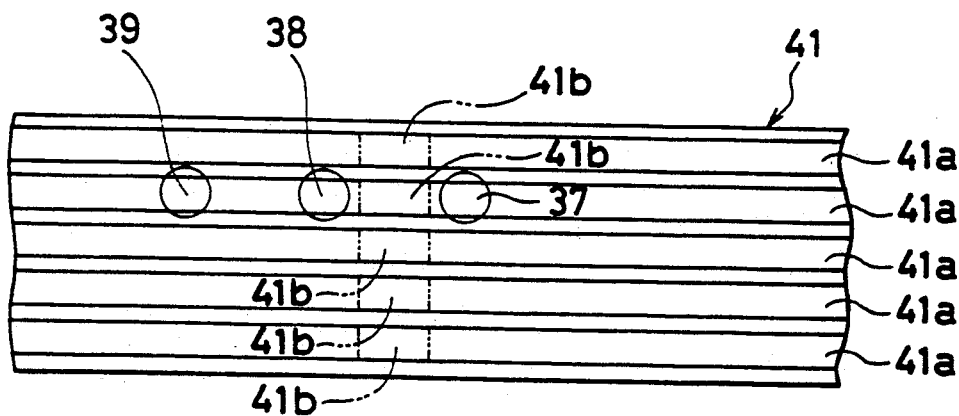
FIG. 5 is a diagram showing another embodiment of the present invention, particularly illustrating one example of the light beams and an arrangement of ID sections of for a magneto-optical disk.
Figure 6:
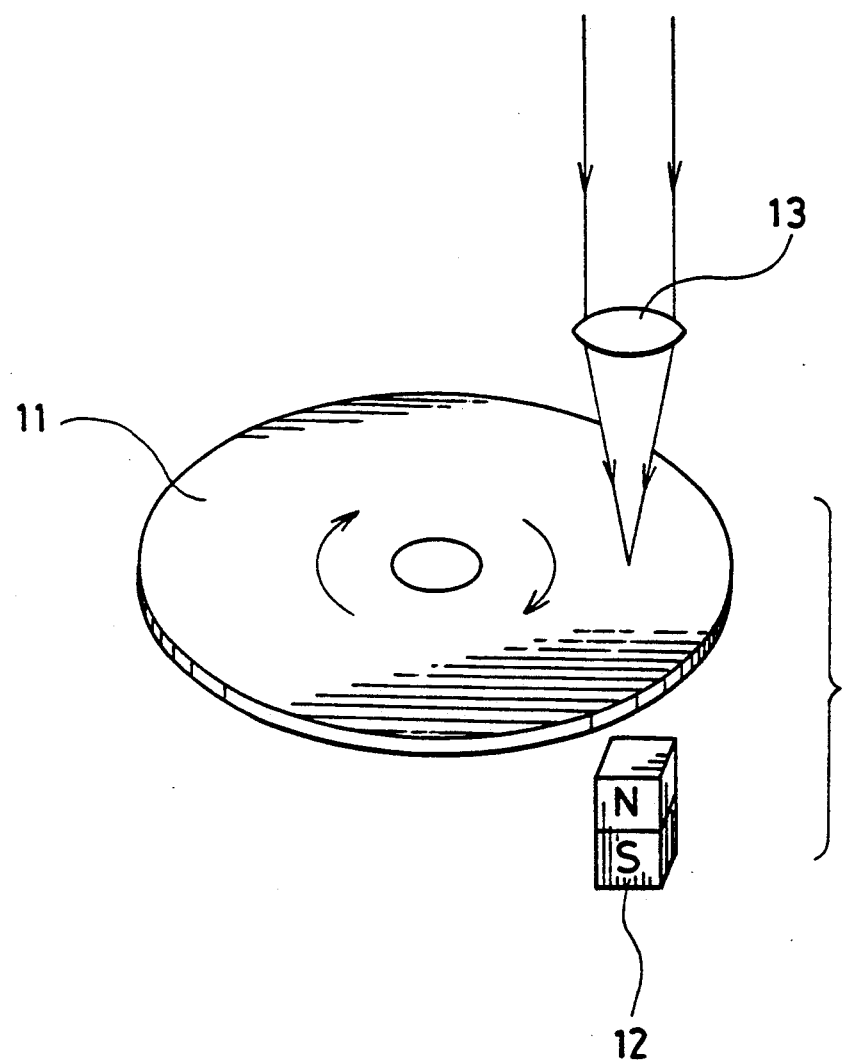
Figure 7:
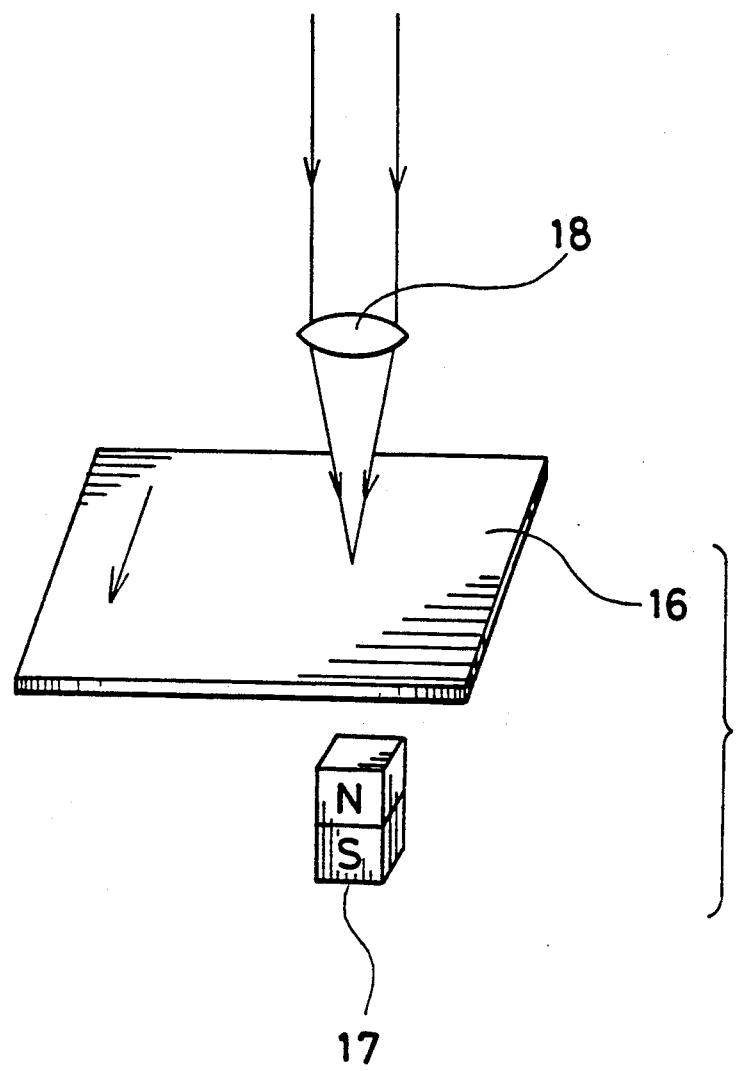
Figure 8:
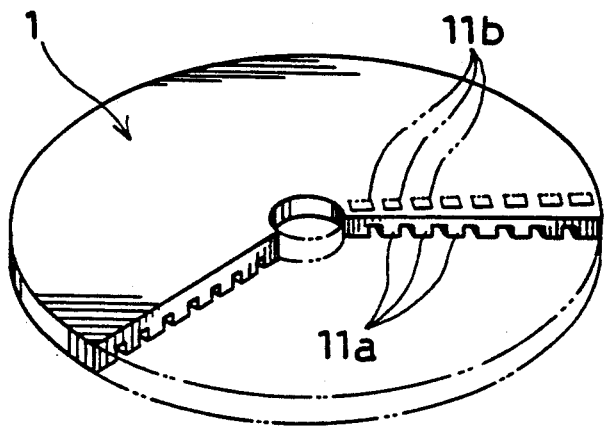
Figure 9:
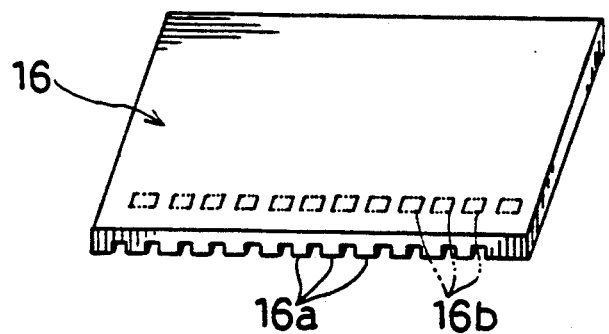
Figure 10:
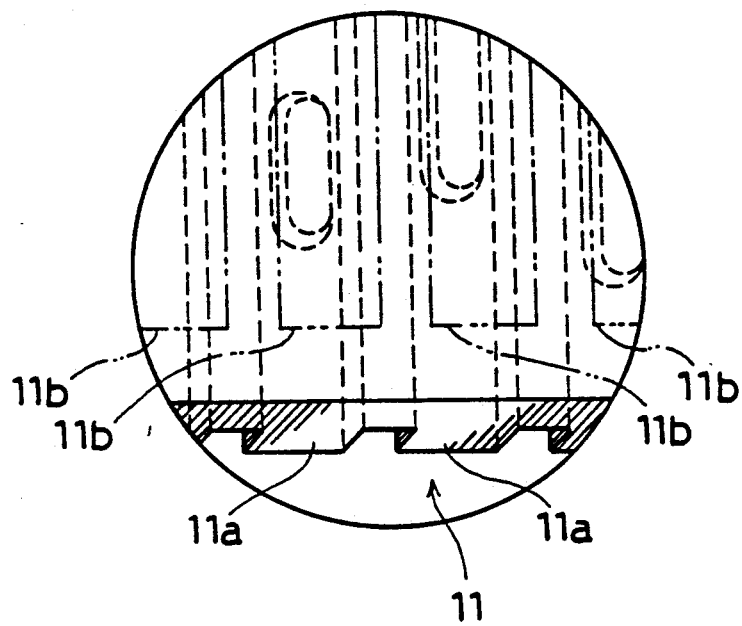
Figure 11:
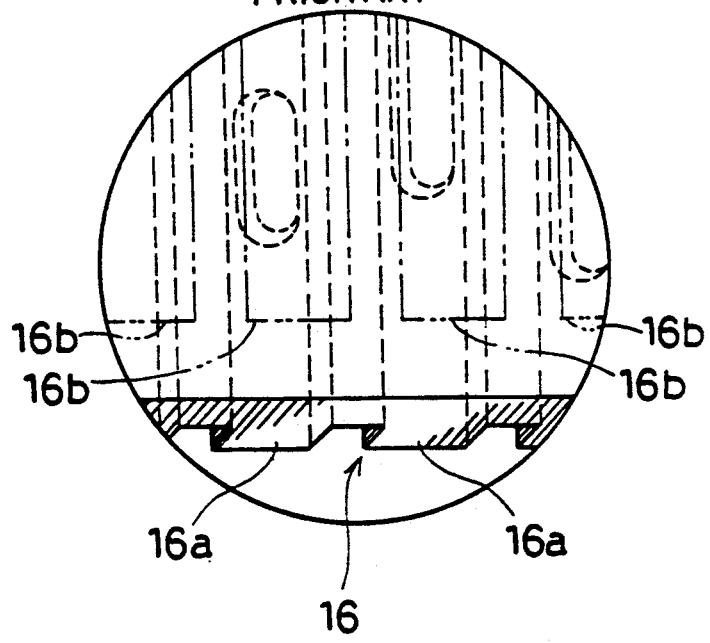
Figure 12:
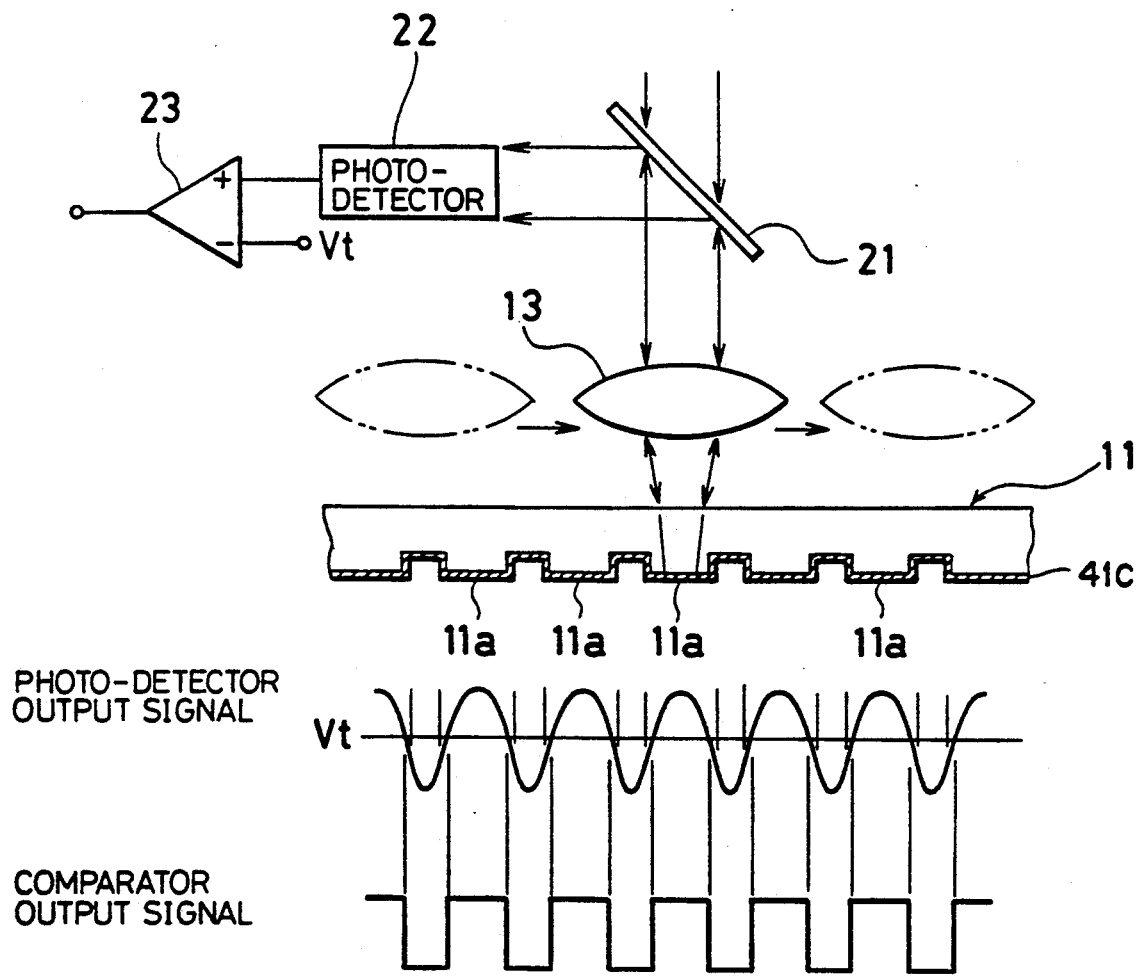

Another example of how to arrange the ID sections 41b and the plurality of light beams in accordance with the present invention is illustrated in FIG. 5. Here, the ID sections 41b are aligned in the alignment direction of the guide grooves 41b. On the other hand, the light beams 37 to 39 are projected so as to be aligned in a direction parallel with the direction of the guide grooves 41a at intervals longer than the length of each of the ID sections 41b. The diameter of each of the light beams 37 to 39 is substantially equal to the width of each of the guide grooves 41a. With the above arrangement, more than half, i.e., more than two, of the three light beams 37 to 39 do not happen to be projected on the ID sections 41b at the same time.

Also, the majority logic circuit 57 is not limited to the one having the AND circuits 57a and the OR circuit 57b as earlier mentioned.

As described above, an optical memory system according to the present invention includes:

a light beam generating means for generating a plurality of light beams;

a recording medium having a plurality of guide grooves for guiding each of the light beams, and ID sections utilized for identifying a guide groove on which each of the light beams is projected;

a plurality of photo-detectors for detecting the intensity of the reflected light or transmitted light of each of light beams projected on the recording medium;

a plurality of comparators for converting a signal released from each of the photo-detectors into a binary signal;

a majority logic circuit for issuing a signal whose level is equivalent to the levels of the signals released from the majority of the comparators; and a moving amount detecting means for detecting the moving amount of the light beams by counting the number of pulses in the pulse signal released from the majority logic circuit when the light beams move in a direction perpendicular to the guide grooves and;

the alignment of the plurality of light beams with respect to the ID sections being such that more than half of the light beams are not simultaneously projected on the ID sections.

In the optical memory system having the above construction, the number of pulses in the pulse signal released from the majority logic circuit when the light beams move in a direction perpendicular to the guide grooves is not influenced by ID signals etc. and is coincident with the number of guide grooves through which the respective light beams have passed. Accordingly, the accurate moving amount of the light beams can be obtained yielding high accuracy in the access operation.

The above recording medium may be made of a plastic, glass, or other material in the form of a disk or a card, and may be designed to include a magnetic film comprising Cd, Te, Fe, Co, or the like formed on the back face thereof, and the magnetizing direction of the magnetic film changing in accordance with an external magnetic field which exerts an influence upon the magnetic film.

Accordingly, when the temperature of the recording medium locally rises higher than Curie point because of the light beam intensity, the magnetizing direction of the magnetic film is locally inverted due to the effect of an external magnetic field.

The above majority logic circuit may include logical elements such as an AND gate and OR gate, and the above moving amount detecting means may comprise a digital counter. This permits only the number of pulses corresponding to the number of guide grooves through which the respective light beams have actually passed to be obtained.

The above recording medium may also be arranged to have three adjacent ID sections placed such that at least two ID sections are not perfectly overlapped in a parallel direction to the guide grooves. This permits the number of light beams projected on the ID sections at the same time to be less than half of the total number of light beams projected on the recording medium.

The number of light beams projected on the ID sections at the same time can be limited to less than half of the total number of light beams by such an arrangement that while the ID sections are aligned in a direction perpendicular to the guide grooves, the light beams are projected at intervals longer than the length of the ID section so that at least more than half of the light beams do not perfectly overlap one another in a parallel direction to the guide grooves.

Further, the above light beam generating means may comprise a diffraction grating which diffracts the light beam from the light beam source into a zero-order light and two first-order lights. This permits generation of three light beams from one light beam source.

The respective numbers of light beams, photo-detectors and comparators are not limited to three but may correspond to the number of pulse signals with which a majority decision by the majority logic circuit can be performed.

What is claimed is:

1. A track access and laser alignment system for an optical recording and reproducing apparatus comprising:
    light beam generating means for generating and projecting a plurality of light beams to a recording medium having substantially parallel tracks with guide grooves disposed therein, and ID sections within each said guide groove for identification of said tracks, such that said light beams are aligned with respect to the guide grooves and ID sections;
    rotation means for rotating said recording medium under said plurality of light beams;
    a plurality of photo-detectors for detecting the intensity of each of said light beams projected by said light beam generating means and reflected by said recording medium or each of said light beams projected by said light beam generating means and transmitted through said recording medium, each of said photo-detectors producing a signal indicative of the intensity of one of said light beams;
    a plurality of comparators for converting the signals released from each of said photo-detectors into binary signals;
    a majority logic circuit for issuing a pulse signal whose level is high when the majority of said binary signals simultaneously fed thereto are in a high level, and for issuing a pulse signal whose level is low when the majority of said binary signals simultaneously fed thereto are in a low level;
    access operating means for moving said light generating means so that said light beams move in a direction perpendicular to the tracks for causing said light generating means to project said light beams upon a desired track;
    moving amount detecting means for detecting the moving amount of said light beams by counting the number of pulses in the low or high pulse signal released from said majority logic circuit when said light beams are moved by said access operating means in a direction perpendicular to said tracks; and
    wherein said access operating means responsive to said moving detecting means and said plurality of light beams are aligned by said light beam generating means with respect to the ID sections such that said light beams are simultaneously projected on the ID sections totaling less than half of the total number of light beams.

2. The track access and laser alignment system according to claim 1 wherein said recording medium comprises a substrate made of a plastic in the form of a disk.

3. The track access and laser alignment system according to claim 1 wherein said recording medium comprises a substrate made of glass.

4. The track access and laser alignment system according to claim 3 wherein said recording medium is in the form of a card.

5. The track access and laser alignment system according to claim 3 wherein said recording medium is in the form of a disk.

6. The track access and laser alignment system according to claim 1 wherein said recording medium is in the form of a card.

7. The track access and laser alignment system according to claim 1 wherein said majority circuit comprises logical elements for receiving said binary signals from said comparators and producing the low or high pulse signal.

8. The track access and laser alignment system according to claim 1 wherein said moving amount detecting means comprises a digital counter.

9. The track access and laser alignment system according to claim 1 wherein:
    said recording medium is designed so that the ID sections are aligned on adjacent guide grooves; and
    said light beams are projected on said recording medium such that the plurality of light beams only encounter ID sections totalling less than half of the total number of beams.

10. The track access and laser alignment system according to claim 9 wherein the diameter of each of the light beam is substantially equal to the width of each of the guide grooves.

11. The track access operation and laser alignment system according to claim 1 wherein said light beams, said photo-detectors and said comparators respectively correspond in number to the number of said binary signals to be fed to said majority logic circuit, the number of said binary signals being adapted to provide a majority decision by the majority logic circuit.

12. The track access and laser beam alignment system according to claim 1, wherein said light beam generating means comprises a diffraction grating for diffracting each of said plurality of light beams into one zero-order light and two first-order lights, respectively.

13. The track access and laser alignment system according to claim 1 wherein the light beam generating means aligns the plurality of light beams in a direction perpendicular to the guide grooves, and projects said light beams onto said recording medium so that the plurality of light beams simultaneously projected by said light beam generating means on the ID sections total less than half of the total number of light beams.

14. The track access and laser alignment system according to claim 13 wherein:
said light beams are respectively projected on adjacent guide grooves such that said light beam generating means projects only one light beam upon only one guide groove; and
the diameter of each of the light beams is substantially equal to the width of each of the guide grooves.

15. The track access and laser alignment system according to claim 1 wherein said light beam generating means projects light beams on said recording medium so as to be aligned in parallel with and on said guide grooves and at intervals longer than the length of an ID section.

16. A track access operation and laser alignment system for an optical recording and reproducing apparatus comprising:
light beam generating means for generating and projecting a plurality of light beams onto a recording medium having substantially parallel tracks with guide grooves disposed therein, and ID sections within each said guide groove for indentification of said tracks, such that said light beams are aligned with respect to the guide grooves and ID sections;
rotation means for rotating said recording medium under said plurality of light beams;
a plurality of photo-detectors for detecting the intensity of each of said light beams reflected by said recording medium and transmitted by said light beam generating means, each of said photo-detectors producing a signal indicative of the intensity of one of said light beams;
a plurality of comparators for converting the signals released from each of said photo-detectors into binary signals;
a majority logic circuit for issuing a pulse signal whose level is equivalent to said binary signals released from a majority of said comparators;
moving amount detecting means for detecting the moving amount of said light beams by counting the number of pulses in the pulse signal issued from said majority logic circuit when said recording medium is moved by said rotation means so that said light beams project onto said recording medium in a direction perpendicular to said guide grooves; and
wherein said plurality of light beams are focused parallel to said guide grooves and only encounter ID sections at any one time totalling less than half of the total number of light beams.

17. The track access and laser alignment system according to claim 16 wherein said recording medium comprises a plastic substrate in the form of a disk and a magnetic film comprised from the group consisting of Te, Fe, and Co and attached to said substrate.

18. The track access and laser alignment system according to claim 16 wherein said recording medium comprises a glass substrate in the form of a disk and a magnetic film comprised from the group consisting of Cd, Te, Fe, and Co and attached to said substrate.

19. The track access and laser alignment system according to claim 16 wherein said recording medium is in the form of a card.

20. The track access and laser alignment system according to claim 16 wherein said majority logic circuit comprises logical elements for receiving said binary signals from said comparators and producing the low or high pulse signal.

21. The track access and laser alignment system according to claim 16 wherein said moving amount detecting means comprises a digital counter.

22. The track access and laser alignment system according to claim 16 wherein said ID sections of said recording medium are aligned in a direction perpendicular to said guiding grooves, so that said light generating means projects the plurality of light beams at intervals longer than the length of each respective ID section.

23. The track access and laser alignment system according to claim 16 wherein said light beams, said photo-detectors and said comparators respectively correspond in number to the number of said binary signals to be fed to said majority logic circuit, the number of said binary signals being adapted to provide a majority decision by the majority logic circuit.

24. The track access and laser beam alignment system according to claim 16, comprising a diffraction grating for diffracting each of said plurality of light beams from said light beam generating means into one zero-order light and two first-order lights, respectively.

* * * * *